US006360107B1

United States Patent
Lin et al.

(10) Patent No.: US 6,360,107 B1
(45) Date of Patent: Mar. 19, 2002

(54) APPARATUS, METHOD AND SYSTEM FOR TOPOLOGICAL CHANNEL ASSIGNMENT FOR FOCUSED BEAM, FIXED WIRELESS TELECOMMUNICATIONS

(75) Inventors: Sheng Ling Lin, Lisle; Shang-Fon Su, Naperville, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/289,070

(22) Filed: Apr. 8, 1999

(51) Int. Cl.$^7$ ................................................. H04B 1/38
(52) U.S. Cl. ........................... 455/562; 455/62; 455/63
(58) Field of Search ........................... 455/62, 63, 464,
455/452, 502, 524, 525, 562, 25, 422, 447;
370/337, 347, 350; 343/777

(56) References Cited

U.S. PATENT DOCUMENTS

| | | | | |
|---|---|---|---|---|
| 5,701,583 A | * | 12/1997 | Harbin et al. ................. | 455/25 |
| 5,714,957 A | * | 2/1998 | Searle et al. ................. | 342/374 |
| 5,890,067 A | * | 3/1999 | Chang et al. ................. | 455/446 |
| 6,091,936 A | * | 7/2000 | Chennakesku et al. ....... | 455/63 |
| 6,141,335 A | * | 10/2000 | Kuwahara et al. ........... | 455/513 |
| 6,167,286 A | * | 12/2000 | Ward et al. .................. | 455/562 |
| 6,169,910 B1 | * | 1/2001 | Tamil et al. ................. | 456/562 |

\* cited by examiner

*Primary Examiner*—Nay Maung
*Assistant Examiner*—Sonny Trinh
(74) *Attorney, Agent, or Firm*—Nancy R. Gamburd

(57) ABSTRACT

An apparatus, method and system are provided for topological channel assignment for focused beam, fixed wireless telecommunications. The preferred system embodiment includes a plurality of transceivers coupled to a telecommunications switch, in which each transceiver utilizes a narrow focused beam on the order of ten degrees, for full duplex communication with fixed customer premise equipment. The geographic region is topologically divided, preferably, into a plurality of adjacent cells, in which each adjacent cell utilizes a distinctive, orthogonal code set from a 10 MHz spectrum. As channels, the various code assignments may be dynamically determined at any given time. The switch includes instructions for determining the cell configurations, determining an available channel (code) set for a selected cell, and within the selected cell, determining the plurality of focused beam ranges to create a corresponding plurality of sectors. Within each sector, the focused beams of the adjacent sectors typically spread or interfere into the given sector, creating interference regions. The switch includes further instructions for determining a plurality of channel subsets for the corresponding plurality of sectors, wherein each channel subset consists of the available channel set excluding an exclusion channel subset of a plurality of exclusion channel subsets; and for each interference region, the switch includes further instructions for assigning the exclusion channel subset of an adjacent sector of the plurality of sectors.

42 Claims, 9 Drawing Sheets

APPARATUS, METHOD AND SYSTEM FOR TOPOLOGICAL CHANNEL ASSIGNMENT FOR FOCUSED BEAM, FIXED WIRELESS TELECOMMUNICATIONS

FIELD OF THE INVENTION

The present invention relates in general to telecommunication systems, and more particularly, to an apparatus, method and system for topological channel assignment for focused beam, fixed wireless telecommunication systems.

BACKGROUND OF THE INVENTION

With the increasing sophistication of telecommunication networks, there are an increasing number of alternatives to wireline distribution of telecommunication services to customer premises, in addition to the traditional or known twisted pair, coaxial cable and fiber optic distribution systems. More particularly, due to the expense of physically distributing wires, cables, or other transmission media to customer premises, wireless technology is becoming increasingly cost advantageous for distribution of such telecommunication services to customer premises.

Particular problems arise, however, with such wireless distribution of telecommunication services. One such problem concerns the saturation of a given region or cell, with demand for transmission bandwidth potentially exceeding availability. Another significant problem for wireless distribution of telecommunication services concerns potential interference in neighboring regions.

Various proposed solutions for such saturation and interference problems have been inadequate, expensive, and computationally intensive. For example, one proposed solution includes consultation with neighboring cells to determine which channels are active and to calculate potential interference patterns. For such a solution, the addition of new channels is increasingly difficult, with a high potential for saturation. In addition, the assignment of channels on a variable basis typically requires significant calculations and monitoring, having significant information processing requirements and a corresponding significant usage of network resources.

As a consequence, a need remains for an apparatus, method and system for efficient wireless distribution of telecommunication services. Such an apparatus, method and system should have a greater capacity for avoiding saturation, and avoiding interference in neighboring regions. In addition, such an apparatus, method and system should be capable of cost-effective implementation, without requiring significant processing resources.

SUMMARY OF THE INVENTION

An apparatus, method and system are provided for topological channel assignment for focused beam, fixed wireless telecommunications. The apparatus, method and system of the present invention provide for efficient wireless distribution of telecommunication services, and have a significant capacity for avoiding saturation and for avoiding interference in neighboring regions.

The preferred system embodiment includes a plurality of transceivers coupled to a telecommunications switch, in which each transceiver utilizes a narrow focused beam preferably on the order of ten degrees, for full duplex communication with fixed customer premise equipment. The various channels may be formed utilizing code division multiple access ("CDMA"), time division multiple access ("TDMA") or other time division multiplexing, frequency division or frequency multiplexing, or any combinations thereof.

The geographic region is divided, preferably, into a plurality of adjacent cells having a hexagonal topology, in which each adjacent cell utilizes a distinctive, orthogonal code set, preferably from a 10 MHz spectrum, utilizing code division multiple access ("CDMA"). As communications channels, the various code set assignments may be dynamically determined at any given time based upon, for example, density characteristics such as usage levels and geographic locations of a plurality of customer premise equipment.

In the preferred system embodiment, the switch includes instructions for determining the cell configurations, determining an available code set for a selected cell, and within the selected cell, determining the plurality of focused beam ranges to create a corresponding plurality of sectors. The various focused beams will also scatter or disperse into adjacent sectors, creating regions of potential interference, referred to as interference regions.

In the preferred system embodiment, the switch includes further instructions for determining a plurality of channel subsets for the corresponding plurality of sectors, wherein each channel subset of the plurality of channel subsets consists of the available channel set excluding an exclusion channel subset of a plurality of exclusion channel subsets. For example, the available channel set for a selected cell may consist of five subsets A, B, C, D and E, referred to herein as exclusion subsets. For any given sector, the switch may determine and assign a channel subset, consisting of the available channel set excluding one of these exclusion subsets, such as excluding subset B, forming a channel subset consisting of A, C, D and E (referred to herein as channel subset ~B).

Next, for each interference region of the plurality of interference regions, the switch includes further instructions for assigning the exclusion channel subset of an adjacent sector of the plurality of sectors. For example, to avoid interference with the sector having the channel subset ~B defined above, in the preferred embodiment, an adjacent sector will utilize exclusion subset B within the corresponding interference region.

Also within the preferred embodiment, the switch includes instructions for determining the plurality of channel subsets as a number of channel subsets equal to the arithmetic sum of (1+RSI), wherein RSI is the smallest ratio of (a range of a sector, of the plurality of sectors) to (a range of its interference regions with its neighboring sectors). In the event that RSI is fractional, RSI may be rounded down to the next lowest integer, or treated as discussed in greater detail below. For example, in the preferred system embodiment in which the sector range is 10 degrees and the interference regions are each 2.5 degrees, RSI equals 4, and the available channel set is divided into five channel subsets, such as ~A, ~B, ~C, ~D and ~E (or, equivalently and without loss of generality, corresponding exclusion subsets A, B, C, D and E).

As a consequence of such channel assignment, the apparatus, method and system of the present invention provide for efficient wireless distribution of telecommunication services, maximizing channel re-use, with a significant capacity for avoiding saturation and for avoiding interference in neighboring regions.

Another significant feature of the various embodiments is that channel assignment may be performed dynamically, as needed, to respond to changing environmental conditions. A greater number or a lesser number of channels, such as codes, may be dynamically assigned to a given region to accommodate network traffic conditions and density characteristics at any given time.

Another significant feature of the present invention, as illustrated in detail below, is that the methodology is not computationally intensive. As a consequence, the various implementations of the invention do not require significant processing resources, and the apparatus, method and system of the present invention are capable of cost-effective implementation.

Numerous other advantages and features of the present invention will become readily apparent from the following detailed description of the invention and the embodiments thereof, from the claims and from the accompanying drawings.

DETAILED DESCRIPTION OF THE PRESENT INVENTION

Figure 1:
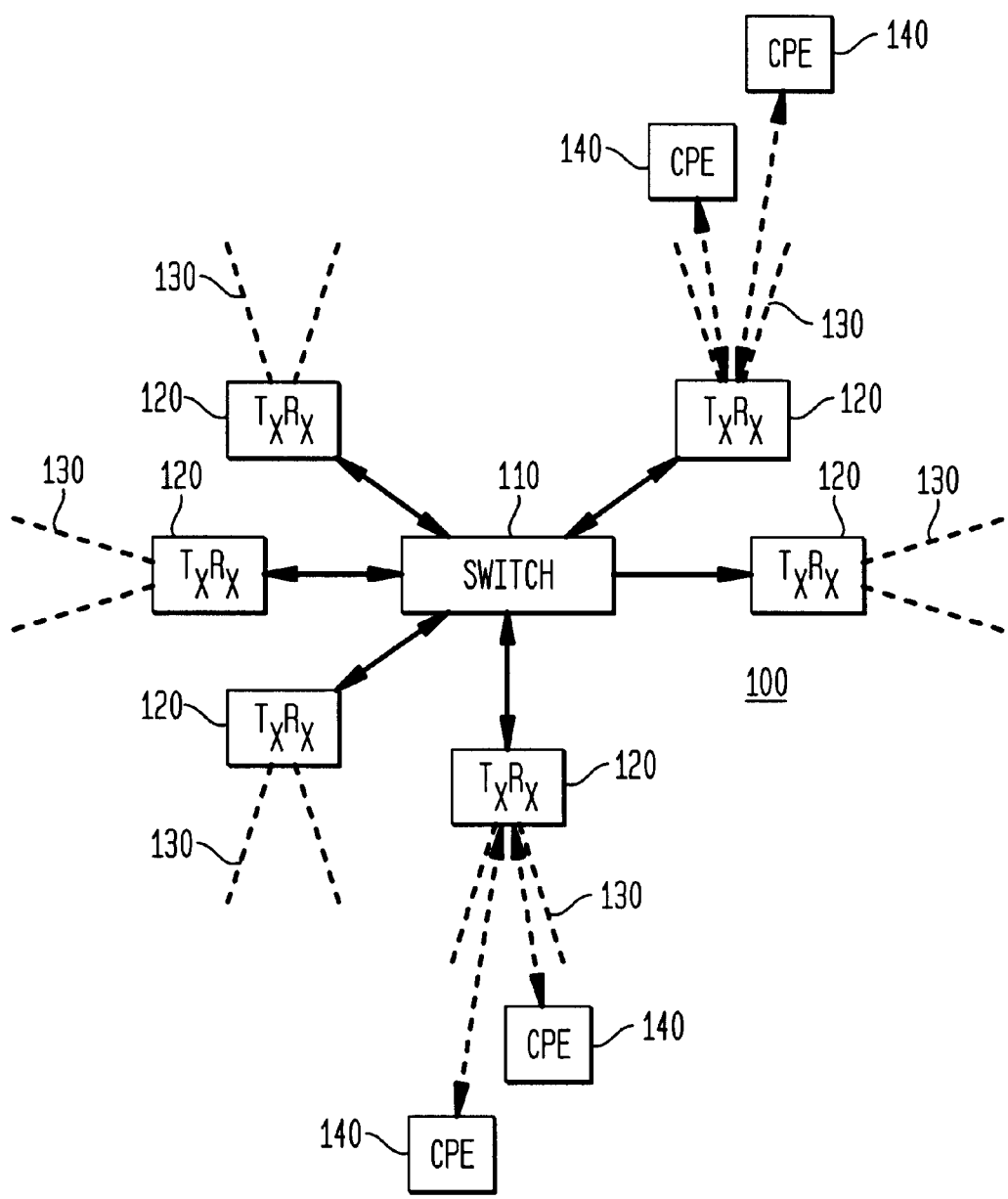
FIG. 1 is a block diagram illustrating a system embodiment in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system for efficient wireless distribution of telecommunication services. Such an apparatus, method and system for efficient wireless distribution of telecommunication services are provided in accordance with the present invention, which have both a greater capacity for avoiding saturation and for avoiding interference in neighboring regions. In addition, the apparatus, method and system of the present invention are capable of cost-effective implementation, without requiring significant processing resources.

Current wireless telecommunication services are primarily designed for mobile environments, in which the end user may be travelling between and among various cellular sectors and entire cells. For these environments, the wireless transceivers typically broadcast (and receive) from a wide area, typically about 120 degrees for each corresponding sector, with 3 (or more) transceivers per cell (geographic region).

In accordance with the system of the present invention, wireless distribution of telecommunication services is provided utilizing a plurality of transceivers to broadcast to and receive from customer premise equipment located in a given geographical region. In marked contrast with other wireless systems, rather than utilizing a wide (120 degree) radio or other cellular frequency beam, in accordance with the present invention, a narrow, focused beam preferably on the order of 10 degrees) is utilized, for transmission and reception to these known, fixed locations of customer premise equipment. In addition, because the end user location (customer premises) is fixed, space is utilized as additional variable to allocate bandwidth and/or time slots for transmission and reception, providing greater capacity and less interference potential. In the preferred embodiments, such bandwidth and time slot allocation is performed first on a regional or cell level, to avoid interference between cells (intercell interference), by allocating frequency bands, codes, time slots, or any combination thereof. Next, to avoid interference between sectors within a cell (intracell interference between neighboring focused beams), additional code, frequency and/or time slot allocations are utilized, enabling maximal code, frequency and/or time slot re-use for greater capacity and less saturation potential. In addition, to maximize capacity and minimize interference, such codes, frequencies and time slots may be allocated on a dynamic basis, without significant processing resources.

The preferred embodiment of the present invention utilizes code assignment (for CDMA), as discussed in greater detail below. As indicated, time slot assignment (for TDMA) and/or frequency band assignment may be equivalently utilized, in addition to or in lieu of code assignment. While the description of the invention primarily refers to assignments of sets of codes, those skilled in the art will understand that assignments of time slots and assignments of frequency bands may be utilized equivalently, and as a consequence, "channel" assignment is used more generally to refer to code, frequency and time slot assignment, and combinations thereof.

FIG. 1 is a block diagram illustrating such a system embodiment 100 in accordance with the present invention. As illustrated in FIG. 1, the system 100 includes one or more switches 110, such as a telecommunication switch or a mobile switching center (adapted for use in a fixed system), coupled to one or more transceivers 120. As discussed in greater detail below, utilizing a focused beam 130, each such transceiver 120 broadcasts information to, and receives information from, customer premise equipment ("CPE") 140 located within the operating region of the transceiver 120 (i.e., within the range of the focused beam 130). Also as discussed in greater detail below, in accordance with the present invention, each such transceiver 120 utilizes a focused beam 130, preferably focused to within or about 10 degrees, in conjunction with channel (frequency, code, and time slot) assignment, to provide telecommunication services to customer premises (CPEs 140) located within its range of transmission and reception.

In the preferred embodiment, a plurality of transceivers 120 are used to provide complete geographic coverage (360 degrees) within a given geographic region or cell. For example, for greater capacity, thirty-six transceivers 120, each having a ten-degree focused beam range, may be utilized to provide such coverage. In contrast, for regions requiring less capacity, fewer transceivers 120 may be utilized, with each transceiver 120 having a greater range of each focused beam, such as utilizing 18 transceivers 120 with each transceiver 120 having a focused beam range of 20 degrees. While not limited to 10 MHz bandwidth at a particular carrier frequency, in the preferred embodiment, the frequency range (bandwidth) for the focused beams 130 of the transceivers 120 of the system 100 is 10 MHz at 1.9 GHz, 2.4 GHz and 3.4 GHz. As discussed in greater detail below, this preferred 10 MHz of bandwidth may be allocated in a variety of ways, such as CDMA, frequency division multiplexing, and with or without time division multiplexing.

Figure 2:
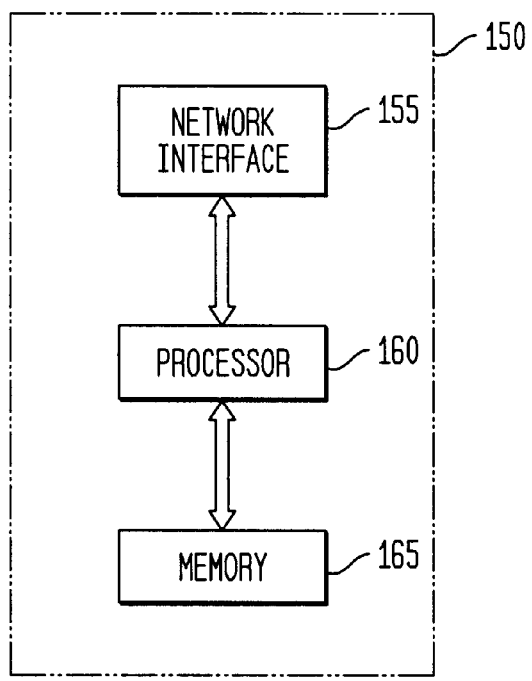
FIG. 2 is a block diagram illustrating an apparatus embodiment in accordance with the present invention.

FIG. 2 is a block diagram illustrating an apparatus embodiment 150 in accordance with the present invention. Such an apparatus 150 may be included within a switch 110, a transceiver 120, or an adjunct network entity coupled to a switch 110 or transceiver 120 (such as a service node, a service control point, or another an intelligent peripheral). Alternatively, the apparatus 150 may be included within, or distributed among, any switches 110, transceivers 120, or adjunct network entities.

Referring to FIG. 2, the apparatus 150 includes a processor 160, a network interface 155, and a memory 165. The network interface 155 is typically couplable to a switch 110 or to a transceiver 120 (when embodied, respectively, in a transceiver 120 or a switch 110) and is utilized to receive and transmit information, such as to receive usage or density information, and to transmit various outgoing directives, for example, to assign or designate particular channels, such as frequencies, time slots or codes. The memory 165 may be a magnetic hard drive, an optical storage device, or any other type of data storage apparatus. The memory 165 is used, in the preferred embodiment, to store program instructions as discussed below. In addition, the memory 165 may also store information pertaining to subscriber location, types of service and subscriber classes, and other call placement and routing information.

Continuing to refer to FIG. 2, the processor 160 may include a single integrated circuit (IC), or may include a plurality of integrated circuits or other components, connected, arranged or grouped together, such as microprocessors, digital signal processors (DSPs), application specific integrated circuits (ASICs), associated memory (such as RAM and ROM), and other ICs and components. As a consequence, as used herein, the term processor should be understood to equivalently mean and include a single processor, or arrangement of processors, microprocessors, controllers or some other grouping of integrated circuits which perform the functions discussed below, with associated memory, such as microprocessor memory or additional RAM, ROM, EPROM or E²PROM. The methodology of the invention, as discussed above and below with reference to FIGS. 1 and 3 through 9, may be programmed and stored, in the processor 160 with its associated memory (or memory 165) and other equivalent components, as a set of program instructions for subsequent execution when the processor 160 is operative (i.e., powered on and functioning).

Figure 3:
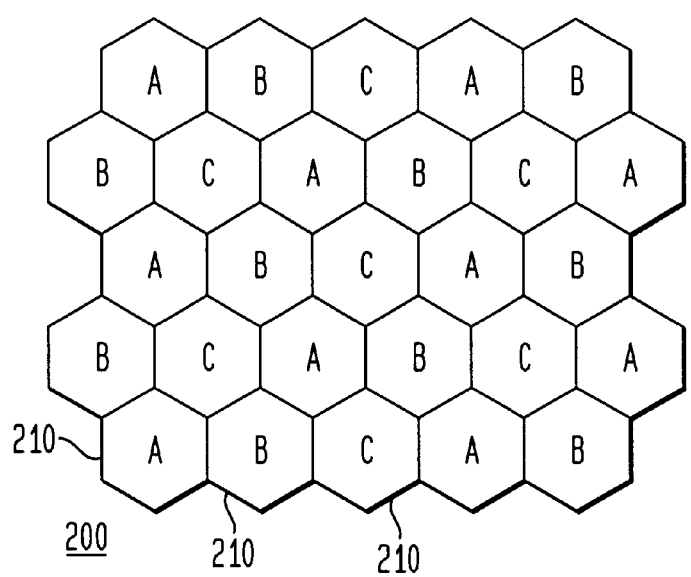
FIG. 3 is a topological diagram illustrating regional, cell level channel assignment for focused beams in accordance with the present invention.

FIG. 3 is a topological diagram illustrating cell level (regional or intercell) channel (code, time slot and frequency) assignment for focused beams in accordance with the present invention. As illustrated in FIG. 3, a geographic region 200 is divided into a plurality of sub-units generally referred to as cells 210. Within each such cell 210, as previously illustrated with reference to FIG. 1, there are a plurality of transceivers 120 coupled to a switch 110, for the transmission and reception of information to customer premise equipment 140 located within each such cell 210. Each switch 110 may encompass or include the transceivers 120 in one or more cells 210, less than all of the transceivers 120 within a given cell 210, or other combinations of transceivers 120. As illustrated in FIG. 3, to avoid interference with neighboring cells 210, a hexagonal cell topology is utilized, with all transceivers 120 within each such cell 210 broadcasting and receiving within a particular set of channels (such as particular sets of codes, frequencies and time slots) which is different from the particular set of channels utilized within each adjacent cell 210, illustrated as channel (code) groups A, B and C. For example, a 10 MHz frequency spectrum may be divided into three frequency bands of 3.33 MHz each. Alternatively, in the preferred embodiment, code division is utilized to eliminate intercell interference from the next neighboring cells. Also utilizing a 10 MHz spectrum, all the codes available within the entire 10 MHz spectrum may also be divided into three groups, preferably orthogonal code groups, and used alternatingly in such neighboring or adjacent cells as illustrated in FIG. 3, with each cell 210 utilizing the entire 10 MHz spectrum. In addition, various sets of time slots may also be assigned for TDMA. The advantage of utilizing such a regionally based, cell-level code division is that the number of codes available with 10 MHz of bandwidth is greater than three times the number of codes available with 3.33 MHz of bandwidth, resulting in a greater number of codes available for use and providing increased capacity.

Figure 4:
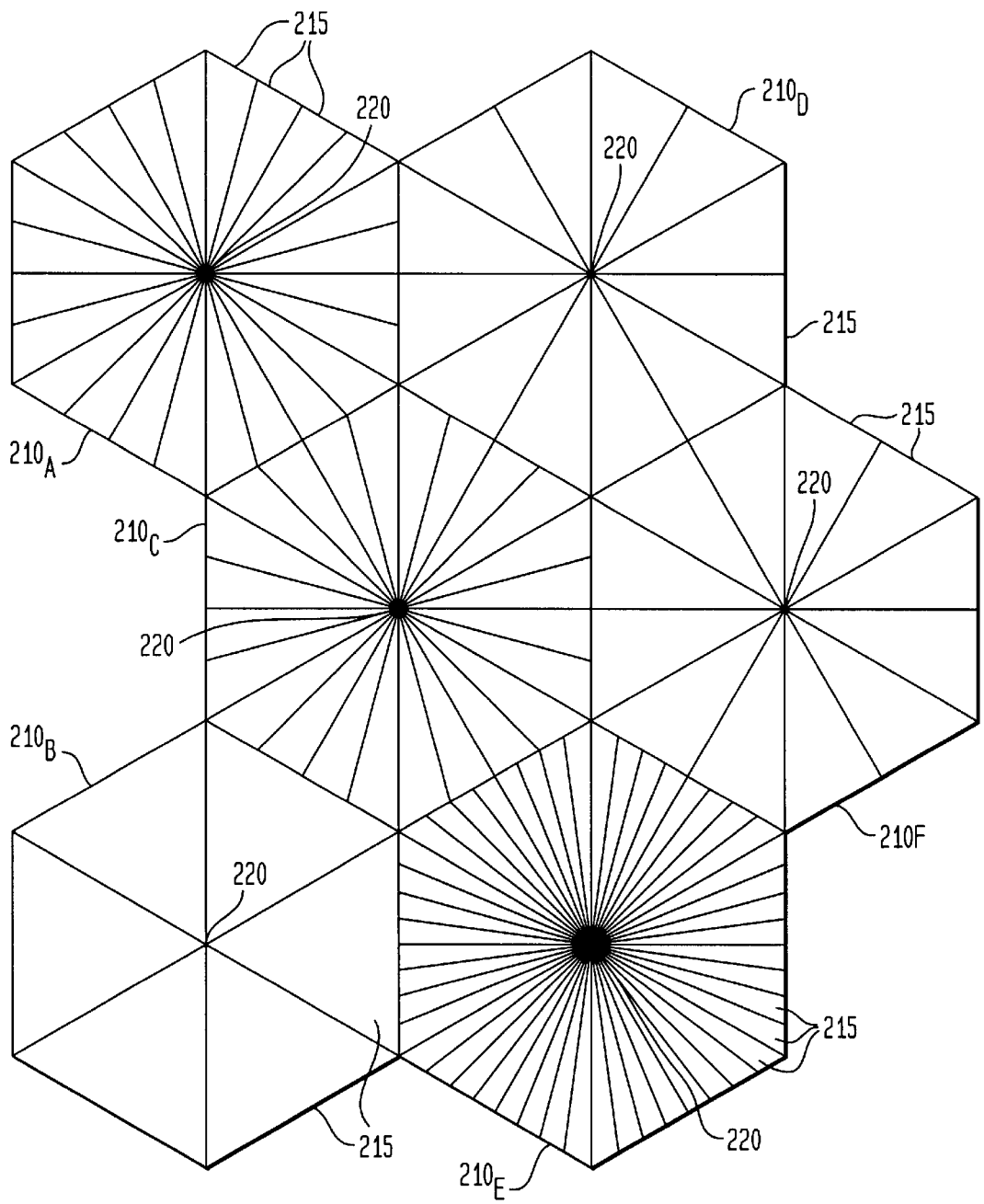
FIG. 4 is a topological diagram illustrating sector (focused beam range) assignment in accordance with the present invention.

FIG. 4 is a topological diagram illustrating sector (focused beam range) assignment in accordance with the present invention. As illustrated in FIG. 4, each cell 210, illustrated as cells 210$_A$ through 210$_F$, is further topologically divided into a plurality of radial or "pie shaped" sectors 215, with each such sector 215 having a transceiver 120 located at or near the apex 220 the sector 215. More particularly, as each transceiver 120 (located within each cell 210) transmits and receives in a particular direction utilizing a focused beam in accordance within the present invention, the focused beam range of each such transceiver 120 defines a corresponding sector 215.

Depending upon density levels, as illustrated in FIG. 4, to provide appropriate coverage and levels of service for the various CPEs 140 located within each cell 210, a particular or given cell 210 may be divided into a variable number of sectors 215. For example, as illustrated in FIG. 4, cell 210$_B$, having the least density illustrated, has been divided into only 6 sectors, with the coverage of each corresponding transceiver 120 spanning 60 degrees (plus overlapping, dispersion, scattering or interference regions as discussed in greater detail below). Also for example, having greater service requirements and thereby greater density, cells 210$_A$ and 210$_C$ have been divided into 24 sectors, with the coverage of each corresponding transceiver 120 spanning 15 degrees (also plus interference regions), while cells 210$_D$ and 210$_F$ (with more intermediate density requirements)

have been divided into 12 sectors, with the coverage of each corresponding transceiver 120 spanning 30 degrees, also plus interference regions. Lastly, cell $210_E$, with the greatest density illustrated, has been divided into 36 sectors, with the coverage of each corresponding transceiver 120 spanning 10 degrees, also plus interference regions.

Figure 5:
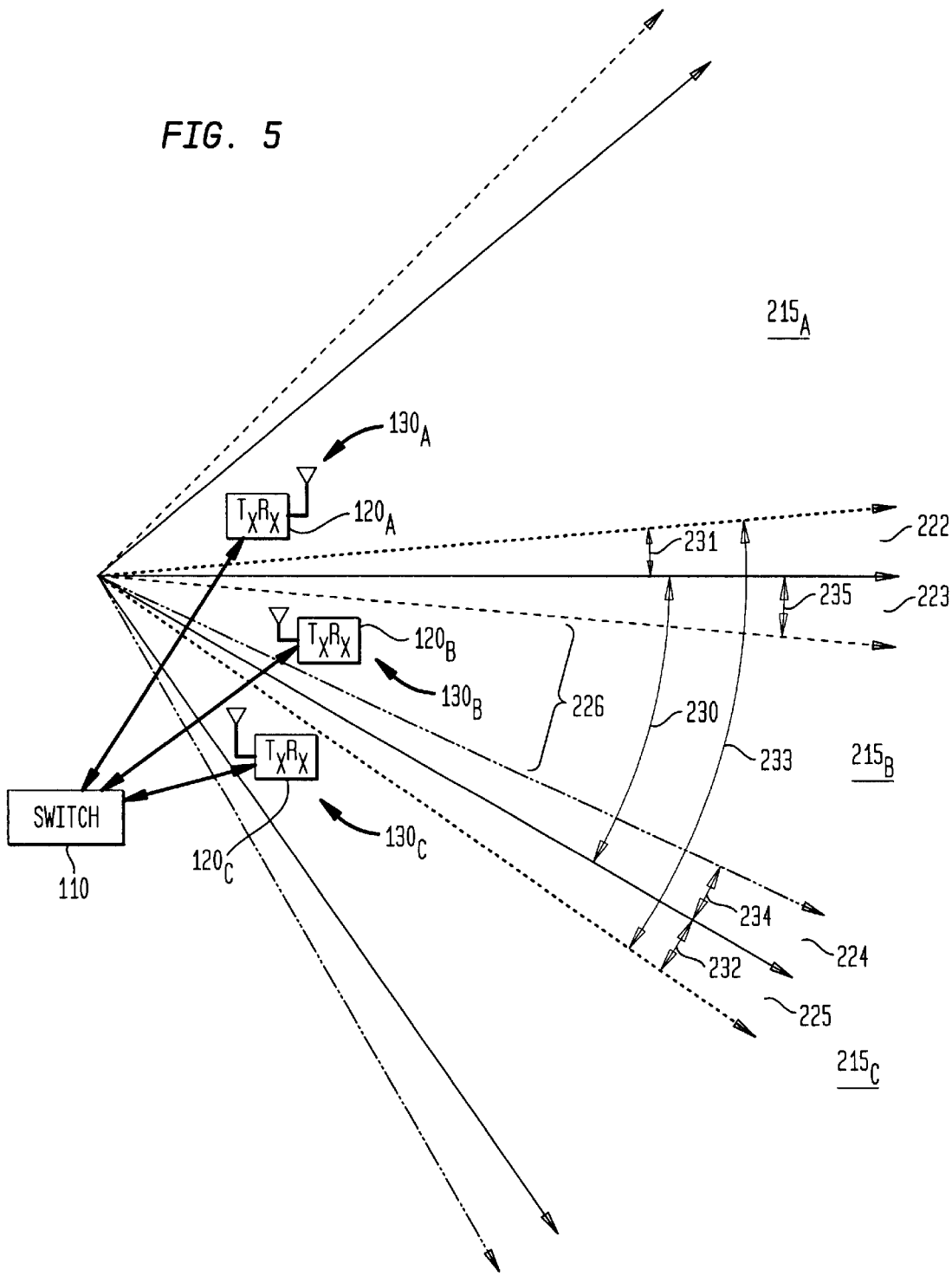
FIG. 5 is a topological diagram illustrating a plurality of sectors, corresponding focused beams and interference regions in accordance with the present invention.
Figure 6A:
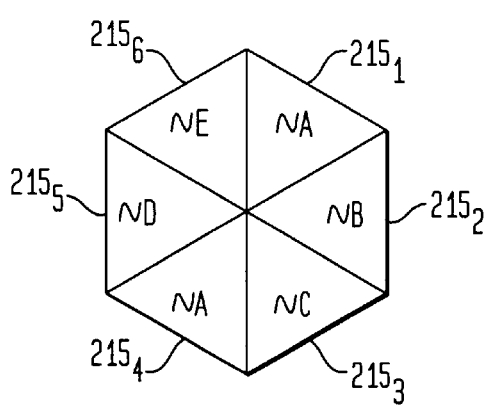
FIG. 6A is a topological diagram illustrating an exemplary sector channel assignment for focused beams in adjacent sectors in accordance with the present invention.
Figure 6B:
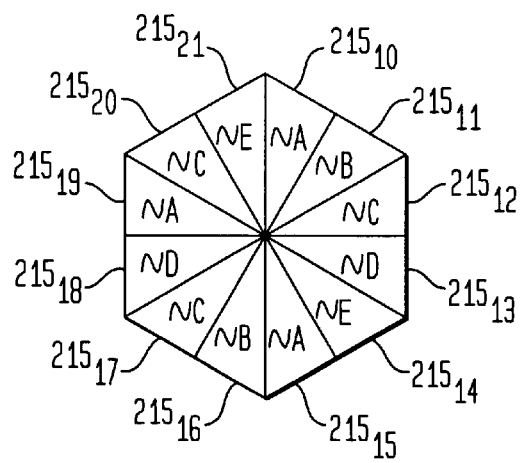
FIG. 6B is a topological diagram illustrating an exemplary sector channel assignment for focused beams in adjacent sectors in accordance with the present invention.
Figure 6C:
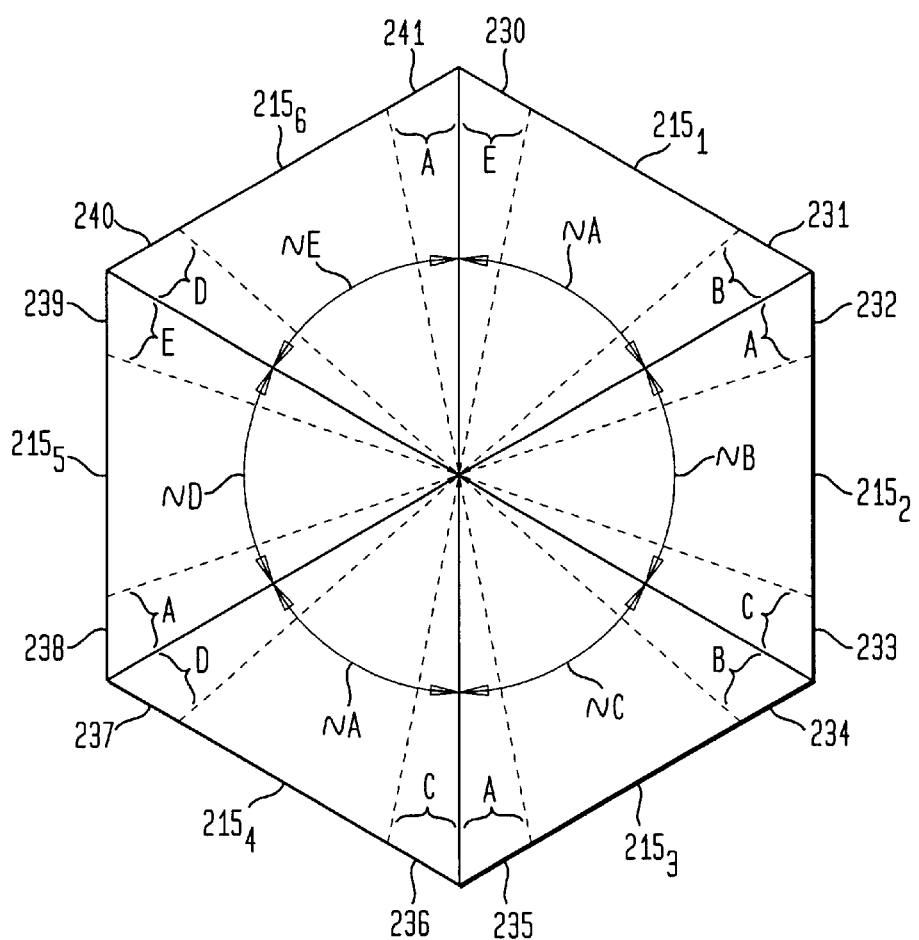
FIG. 6C is a topological diagram illustrating an exemplary sector channel assignment for focused beams in adjacent sectors and in interference regions in accordance with the present invention.
Figure 8:
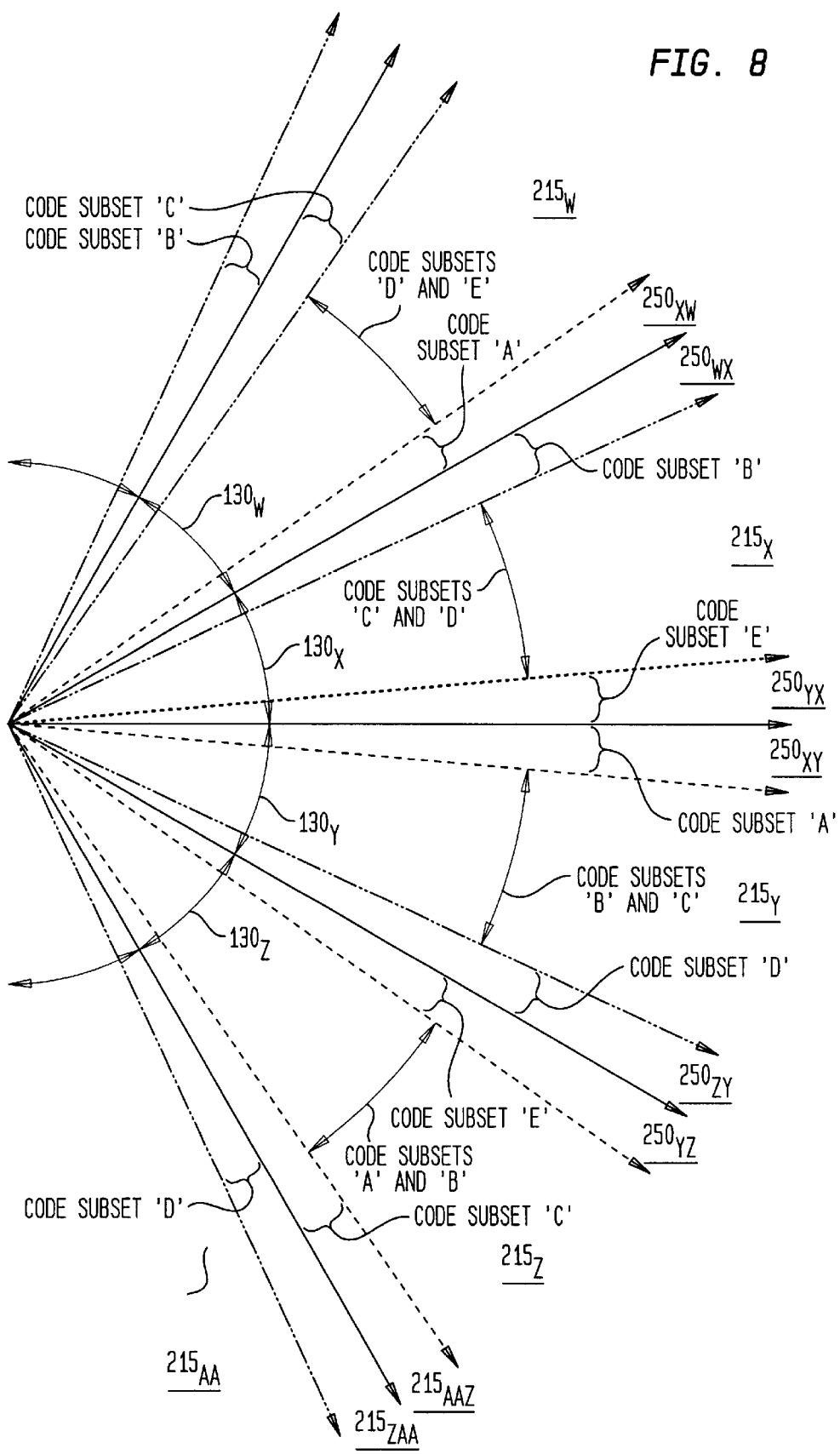
FIG. 8 is a topological diagram illustrating a second exemplary sector code assignment for focused beams in adjacent sectors in accordance with the present invention.

In the preferred embodiment, the beam 130 of each such transceiver 120 is narrowly focused to a preferred 10 degrees, with an expected 2.5 degrees of dispersion or scattering on each side of the focused beam 130, illustrated as interference regions with respect to FIGS. 5, 6C and 8. As mentioned above, the range of the various focused beams may vary from, for example, 8 to 60 degrees, while the various interference regions may span 2 to 15 degrees (of overlap into an adjacent sector).

FIG. 5 is a topological diagram illustrating a plurality of sectors 215, corresponding focused beams 130 and interference (dispersion or overlap) regions 222–225, in accordance with the present invention. As discussed in greater detail below, within each such sector 215, illustrated as adjacent sectors $215_A$, $215_B$ and $215_C$, channels (such as orthogonal codes, time slots and/or separate frequency bands) are assigned such that interference is avoided between next neighboring (adjacent) sectors. For example, in sector $215_B$, a first set of channels (such as a subset of the orthogonal codes available within its cell 210) is assigned (by processor 160) for use by its corresponding transceiver $120_B$. As mentioned above, the focused beam $130_B$ within sector $215_B$ will also scatter (disperse or spread) to some degree into neighboring (adjacent) sectors $215_A$ and $215_C$, illustrated as a first interference region 222 in which the focused beam $130_B$ of sector $215_B$ scatters or overlaps into sector $215_A$; and illustrated as a second interference region 225, in which the focused beam $130_B$ of sector $215_B$ scatters or overlaps into sector $215_C$. Similarly, the focused beam $130_C$ utilized in sector $215_C$ also scatters or overlaps into sector $215_B$, illustrated as a third interference region 224, and the focused beam $130_A$ utilized in sector $215_A$ also scatters or overlaps into sector $215_B$, illustrated as a fourth interference region 223. As mentioned above, in the preferred embodiment, such scatter or overlap is anticipated to be limited radially to 2.5 degrees on each side of a sector 215. Inside these interference regions, the antenna of a CPE 140 may receive signals from both the focused beam 130 within its sector 215 and also from the focused beam 130 within the adjacent sector 215, resulting in potential intracell interference. Outside of these interference regions (illustrated, for example, as region 226 within sector $215_B$), the signals of the adjacent sectors' focused beams 130 decay to a level of background noise, and have negligible interference with the given sector's focused beam 130 (such as focused beam $130_B$ within sector $215_B$).

As a consequence, to avoid such intracell interference in accordance with the present invention, inside both of the interference regions of focused beam $130_B$, namely interference regions 222 and 225, the adjacent focused beams $130_A$ and $130_C$ within respective adjacent sectors $215_A$ and $215_C$ should not use the same channels (codes) used by the focused beam $130_B$ in sector $215_B$. Within these interference regions 222 and 225, however, the same channels (codes) may be utilized by both of the focused beams $130_A$ and $130_C$ within their respective (non-adjacent). sectors $215_A$ and $215_C$. Also as a consequence, because the focused beams $130_A$ and $130_C$ do not use the same channels (codes) within the interference regions 222 and 225 as may be used by focused beam $130_B$, the scatter or dispersion from these focused beams $130_A$ and $130_C$ (as interference regions 223 and 224, respectively), symmetrically also do not interfere with the channels (codes) utilized by focused beam $130_B$ within these interference regions 223 and 224. In accordance within the present invention, therefore, within one focused beam 130 (such as focused beam $130_B$) and one adjacent interference region, such as interference region 222 or interference region 225, the entire set of channels (full codes, frequencies and time slots) may be utilized without interference. In the preferred embodiment, utilizing a 10 degree focused beam 130 having an adjacent interference region of 2.5 degrees, the full set of channels (full set of codes) may be utilized in a 12.5 degree radial section within a cell 210, with each focused beam 130 thereby utilizing 80% (1/(1.25)) of all the available codes. In general, the channel utilization within a cell is RSI/(RSI+1), with a larger RSI leading to a higher channel utilization.

FIGS. 6A, 6B and 6C are topological diagrams illustrating exemplary sector channel assignments for focused beams in adjacent sectors in accordance with the present invention. As indicated above, from the set of all available channels, the channel set utilized within any given sector 215 consists of the entire set of channels excluding a subset of channels utilized in the adjacent interference regions. Such channel subset exclusion is referred to and illustrated herein utilizing a "~"; for example, "channel set ~A" consists of the entire available channel set excluding channel subset A (exclusion channel subset A); while "channel set ~B" consists of the entire available channel set excluding channel subset B (exclusion channel subset B), and so on.

FIG. 6A is a topological diagram illustrating a first level of channel assignment for focused beams in accordance with the present invention. As illustrated, based upon its density characteristics, the particular cell 210 has been divided into six sectors $215_1$ through $215_6$. Utilizing five channel (or code) subsets, channels have been assigned to each sector 215 as follows: channel subset ~A is assigned to and utilized in sector $215_1$; channel subset ~B is assigned to and utilized in sector $215_2$; channel subset ~C is assigned to and utilized in sector $215_3$; channel subset ~A is assigned to and utilized in sector $215_4$; channel subset ~D is assigned to and utilized in sector $215_5$; and channel subset ~E is assigned to and utilized in sector $215_1$.

FIG. 6B is a topological diagram also illustrating a first level of channel assignment for focused beams in accordance with the present invention. As illustrated, based upon its density characteristics, the particular cell 210 has been divided into twelve sectors $215_{10}$ through $215_{21}$, having a greater relative density than the cell illustrated with respect to FIG. 6A. Also utilizing five channel (or code) subsets, channels have been assigned to each sector 215 as follows: channel subset ~A is assigned to and utilized in sector $215_{10}$; channel subset ~B is assigned to and utilized in sector $215_{11}$; channel subset ~C is assigned to and utilized in sector $215_{12}$; channel subset ~D is assigned to and utilized in sector $215_{13}$; channel subset ~E is assigned to and utilized in sector $215_{14}$; channel subset ~A is assigned to and utilized in sector $215_{15}$; channel subset ~B is assigned to and utilized in sector $215_{16}$; channel subset ~C is assigned to and utilized in sector $215_{17}$; channel subset ~D is assigned to and utilized in sector $215_{18}$; channel subset ~A is assigned to and utilized in sector $215_{19}$; channel subset ~C is assigned to and utilized in sector $215_{20}$; and channel subset ~E is assigned to and utilized in sector $215_{21}$.

FIG. 6C is a topological diagram illustrating a second level of channel assignment in interference regions for focused beams in accordance with the present invention. Following from FIG. 6A, in which a first level of channel assignment was performed on a sector level, this second level assigns channels within the various interference regions of each sector within a given cell. As illustrated in FIG. 6C, for each sector 215, there are two interference regions from the focused beams 130 of the adjacent sectors. Also for a given sector 215, the focused beam 130 of that sector produces interference regions in the adjacent sectors, which may be accounted for by the channel assignments pertinent to each of those adjacent sectors, as illustrated below.

Continuing to refer to FIG. 6C, beginning with sector $215_1$ with a channel subset ~A, additional channel subsets are to be assigned to the interference regions 230 and 231 of this sector $215_1$, based upon the exclusion (or excluded) subsets of the adjacent sectors $215_6$ and $215_2$. To avoid potential interference with the adjacent sector $215_6$ which has the channel subset ~E, a further channel subset (from the subset ~A of sector $215_1$) is assigned to interference region 230, namely, a subset of channels affirmatively comprised of the E exclusion subset. In this way, because sector $215_6$ utilizes all channels except E (i.e., ~E), then the transceiver 120 of sector $215_6$ may ignore any channel subset E communications which it may receive. Similarly, to avoid potential interference with the adjacent sector $215_2$ which has the channel subset ~B, a further channel subset (from the subset ~A of sector $215_1$) is assigned to interference region 231, namely, a subset of channels affirmatively comprised of the B exclusion subset. In this way, because sector $215_2$ utilizes all channels except B (i.e., ~B), then the transceiver 120 of sector $215_2$ may ignore any channel subset B communications which it may receive. As a consequence, the wireless communications which may occur within sector $215_1$ do not interfere with the communications within the adjacent sectors $215_6$ and $215_2$.

Channel assignments for the remaining sectors 215 proceed similarly:

For sector $215_2$: (a) to avoid potential interference with the adjacent sector $215_1$ which has the channel subset ~A, a further channel subset affirmatively comprised of the A subset (from the subset ~B of sector $215_2$) is assigned to interference region 232; and (b) to avoid potential interference with the adjacent sector $215_3$ which has the channel subset ~C, a further channel subset affirmatively comprised of the C subset (from the subset ~B of sector $215_2$) is assigned to interference region 233.

For sector $215_3$: (a) to avoid potential interference with the adjacent sector $215_2$ which has the channel subset ~B, a further channel subset affirmatively comprised of the B subset (from the subset ~C of sector $215_3$) is assigned to interference region 234; and (b) to avoid potential interference with the adjacent sector $215_4$ which has the channel subset ~A, a further channel subset affirmatively comprised of the A subset (from the subset ~C of sector $215_3$) is assigned to interference region 235.

For sector $215_4$: (a) to avoid potential interference with the adjacent sector $215_3$ which has the channel subset ~C, a further channel subset affirmatively comprised of the C subset (from the subset ~A of sector $215_4$) is assigned to interference region 236; and (b) to avoid potential interference with the adjacent sector $215_5$ which has the channel subset ~D, a further channel subset affirmatively comprised of the D subset (from the subset ~A of sector $215_4$) is assigned to interference region 237.

For sector $215_5$: (a) to avoid potential interference with the adjacent sector $215_4$ which has the channel subset ~A, a further channel subset affirmatively comprised of the A subset (from the subset ~D of sector $215_5$) is assigned to interference region 238; and (b) to avoid potential interference with the adjacent sector $215_6$ which has the channel subset ~E, a further channel subset affirmatively comprised of the E subset (from the subset ~D of sector $215_5$) is assigned to interference region 239.

For sector $215_6$: (a) to avoid potential interference with the adjacent sector $215_5$ which has the channel subset ~D, a further channel subset affirmatively comprised of the D subset (from the subset ~E of sector $215_6$) is assigned to interference region 240; and (b) to avoid potential interference with the adjacent sector $215_1$ which has the channel subset ~A, a further channel subset affirmatively comprised of the A subset (from the subset ~E of sector $215_6$) is assigned to interference region 241.

A methodology for channel assignment may be apparent from the above discussion. First, channel groups or sets are assigned to given cells, to avoid interference between neighboring cells. Second, a given cell is divided into sectors, and the available channels, such as codes, frequencies, and time slots, are divided into subsets. Next, for each sector, a first level of channel assignment is performed, followed by a second level of channel assignment to designate the channels to be utilized in the interference regions of each sector.

As mentioned above, cells 210 are divided into sectors 215 based upon density characteristics, such as traffic levels. Once the number of sectors 215 are determined for a given cell 210, then the number of channel (code) subsets are determined. First, in the preferred embodiment, a smallest ratio of sector width to interference width is formed, referred to herein as a "RSI": the range (or width) of the various sectors in the given cell, in units such as degrees, is divided by the range (or width) of its corresponding interference regions, in comparable units, and the smallest of such ratios is selected as the preferred RSI. For example, for a preferred system embodiment in which the smallest sector range (or width) is 10 degrees with an interference region of 2.5 degrees, the RSI is determined to be 4. The number of channel (or code) subsets which should be utilized, of the available, full set of channels, is then equal to (RSI+1), which in this case is 5. The full set of available channels is then divided into a corresponding number of exclusion subsets (in this case 5), such as subsets A, B, C, D and E. As illustrated above, channels may then be assigned to each sector, clockwise or counterclockwise, for example, as channel subsets ~A, ~B, ~C, ~D and ~E.

In the event that RSI is fractional, various equivalent approaches are available to determine the channel subsets. For example, when RSI is fractional, RSI may be rounded down to the next lower integer value. Alternatively, when RSI is fractional, it includes an integer portion "N" and a fractional (or remainder) portion "R". The available channel set is then proportionally divided into (RSI+1) subsets, in which there are N subsets and a remainder subset R; in this case, the R subset is not used to form exclusion subsets, and all sectors may utilize the R subset in their non-interference regions.

As these channel subsets are assigned to each sector 215 within a given cell 210, two rules or conditions preferably may also be utilized. First, adjacent sectors may not utilize sets of codes which are the same or completely identical to each other; rather, each adjacent sector should have a different excluded (or exclusion) subset. The adjacent sector may then include its neighboring sector's exclusion subset, and use this subset in the corresponding adjacent interference regions (to avoid potential interference), as illustrated above with respect to FIG. 6C.

This first condition (or rule) may be achieved in a variety of ways. For example, when channel subsets are assigned sequentially, a sequence of ~A, ~B, ~C, . . . , ~Y, ~Z, ~A would violate this first condition that adjacent sectors utilize different channel subsets. One of many solutions to such a situation would be to move the violating channel subset assignment to a different position, such as of ~A, ~B, ~C, . . . , ~A, ~Y, ~Z.

For increased flexibility, a second condition or rule of channel assignment is utilized in the preferred embodiment, namely, that the adjacent sectors surrounding a given sector should also utilize different channel subsets. Also for example, when channel subsets are assigned sequentially, a sequence of ~A, ~B, ~C, . . . , ~Y, ~Z, ~A, ~B would violate this second condition that both sectors adjacent to a given sector utilize different channel subsets. One of many solutions to such a situation would be to simply reassign another channel subset to the potentially problematic position, such as reassigning ~Z to a new position at ~A, ~B, ~C, . . . , ~Y, ~A, ~B, ~Z.

Also as may be apparent from the above discussion, there are a myriad number of solutions to any such ordering and assignment of channel subsets to the various sectors 215 within a cell 210. Indeed, such solutions are virtually always available when there are at least five different channel subsets, i.e., RSI>3.

Figure 7:
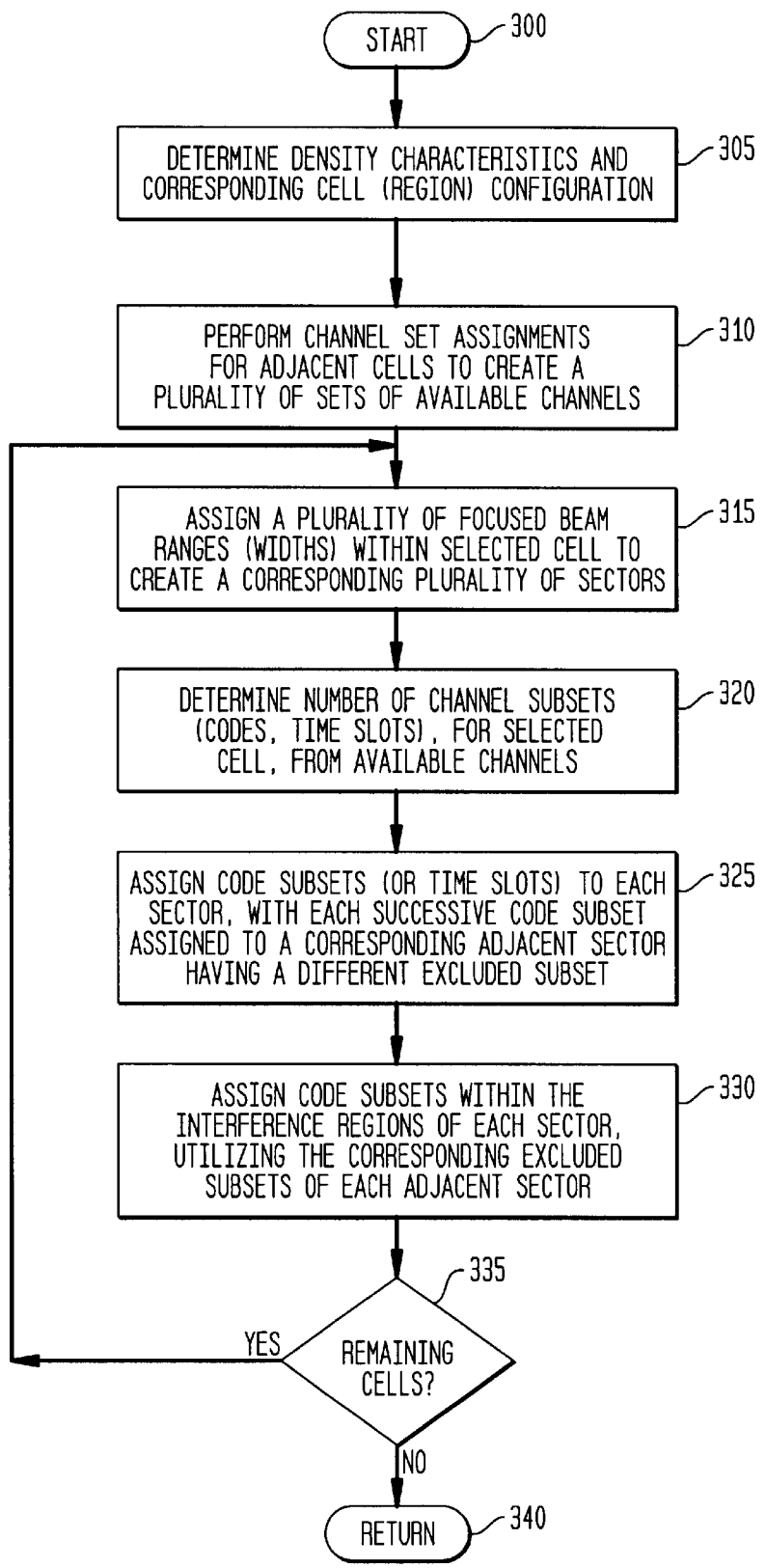
FIG. 7 is a flow diagram illustrating a first method of cell level and sector level frequency and code assignment for focused beams in accordance with the present invention.

Summarizing the above discussion, FIG. 7 is a flow diagram illustrating a first method of cell level and sector level frequency and code assignment for focused beams in accordance with the present invention. Beginning with start step 300, density characteristics and corresponding cell configurations are determined, step 305. For example, various topologies may be selected for the cells comprising a given region, such as the preferred hexagonal topology. In step 310, to avoid potential interference between neighboring cells, channel set assignments are performed for adjacent cells, to create a plurality of different sets of available channels for use within any given cell (as previously illustrated with reference to FIG. 3).

Next, within a selected cell, also based upon density characteristics such as traffic conditions, a plurality of focused beam 130 ranges (widths) are determined, creating a corresponding plurality of sectors (presumably also having corresponding interference regions), step 315. Having determined the sector configuration, the number of channel subsets are determined from the available channel set for the given cell, step 320, for example, dividing the available channel set into (RSI+1) subsets. As mentioned above, in the preferred embodiment, such subsets are determined by excluding a particular subset (e.g., A, B, C, D, E, as exclusion subsets) from the complete set of available channels to form channel subsets (e.g., ~A, ~B, ~C, ~D, ~E).

Also within the selected cell, following such channel subset determination of step 320, in step 325, a channel subset (of the plurality) is assigned to each sector. As illustrated above, in the preferred embodiment, each successive channel subset, assigned to a corresponding adjacent sector 215, utilizes (i.e., excludes) a different excluded subset. Next, in step 330, channel subsets are assigned within the interference regions of each of the sectors 215. In the preferred embodiment, the channel subset assigned in each interference region is the excluded (or exclusion) subset of the adjacent sector, as illustrated above. When there are cells remaining which require channel assignments, step 335, the method returns to step 315. When channels have been assigned to all cells, the method of channel assignment may end, return step 340.

As may be apparent from the above discussion, a significant feature and advantage of the channel assignment methodology of the present invention is the minimization of coordination among sectors and cells. Once channel sets are assigned to each cell, all available channels may be utilized within each sector except for the channels utilized in the designated interference regions. Such determinations may be made without consultation and coordination with neighboring sectors and cells, and as a consequence, conserves appreciable computing, processing, and other network resources.

As an enhancement in the preferred embodiment, channel assignment may be performed on a dynamic basis, depending upon traffic and other usage conditions. For example, the channel subset may be made relatively smaller for an underutilized sector, while the channel subset may be increased for a sector experiencing increased traffic conditions or other increased loading. More particularly, channel assignment between and among sectors and cells may be dynamically coordinated, shifting unused channels from one sector for use in another sector.

FIG. 8 is a topological diagram illustrating in greater detail an exemplary sector channel assignment for focused beams in adjacent sectors, utilizing sets of orthogonal codes to define the plurality of communications channels for wireless transmission and reception, in accordance with the preferred embodiment of the present invention. As illustrated in FIG. 8, for purposes of example, following assignment of orthogonal codes between and among various cells 210, an available code set of a selected cell 210 is divided into five (RSI+1) code subsets A, B, C, D and E, based upon the preferred embodiment in which each cell 210 is divided into 36 sectors 215, with each sector 215 presumed to span ten degrees, with a 2.5 degree interference region of a focused beam 130 into each adjacent sector (RSI=4). Also for example, assuming 100 codes are in available code set to be used as channels for the selected cell 210 (after regional assignment, from the complete code set, to each of the neighboring cells 210 to avoid intercell interference, as discussed above with reference to FIG. 3), then the various exemplary code subsets may be codes 1–20 (A), codes 21–40 (B), codes 41–60 (C), codes 61–80 (D), and codes 81–100 (E).

As illustrated in FIG. 8, the focused beam $130_X$ of the sector $215_X$ utilizes four code subsets, B, C, D and E, and does not utilize code subset A (i.e., consists of channel subset ~A). As a consequence, to avoid intracell interference, focused beams $130_W$ and $130_Y$ utilize code subset A in the adjacent regions of their respective sectors $215_W$ and $215_Y$ into which focused beam $130_X$ scatters or disperses, namely, interference region $250_{XW}$ (in which focused beam $130_X$ scatters into sector $215_W$), and interference region $250_{XY}$ (in which focused beam $130_X$ scatters into sector $215_Y$). Similarly, within sector $215_X$, the code subsets B–E (of channel subset ~A) are also assigned to avoid interference with adjacent sectors $215_W$ and $215_Y$. For example, code subset B is utilized in interference region $250_{WX}$, the region in which the focused beam $130_W$ scatters into sector $215_X$, code subset E is utilized in interference region $250_{YX}$, the region in which the focused beam $130_Y$ scatters into sector $215_X$, with the remaining code subsets C and D utilized in the balance of sector $215_X$ that is not subject to scattering from adjacent focused beams 130, as illustrated.

As a consequence, in the event any CPE 140 or transceiver 120 within sector $215_X$ receives any information encoded with a code from code subset A, such as within interference regions $250_{WX}$ and $250_{YX}$ (in which adjacent focused beams $130_W$ and $130_Y$ scatter into sector $215_X$), that equipment in sector $215_X$ may automatically disregard or ignore such information as scatter or dispersion from one of the focused beams 130 of adjacent sectors $215_W$ or $215_Y$. Similarly, in the event any CPE 140 or transceiver 120 within sector $215_W$ receives any information encoded with a code from code subset B, such as within interference region $250_{XW}$ (in which adjacent focused beam $130_X$ scatters into sector $215_W$), that equipment in sector $215_W$ may automatically disregard or ignore such information as scatter or dispersion from the focused beam $130_X$ of adjacent sector $215_X$. Also in the event any CPE 140 or transceiver 120 within sector $215_Y$ receives any information encoded with a code from code subset E, such as within interference region $250_{XY}$ (in which adjacent focused beam $130_X$ scatters into sector $215_Y$), that equipment in sector $215_Y$ may automatically disregard or ignore such information as scatter or dispersion from the focused beam $130_X$ of adjacent sector $215_X$.

Continuing to refer to FIG. 8, other code subsets are similarly assigned to avoid interference between adjacent sectors. For example, in sector $215_Y$, noting that code subset E was utilized by adjacent focused beam $130_X$ in the interference region $250_{YX}$, the focused beam $130_y$ of the sector $215_X$ utilizes four other code subsets, A, B, C and D, and does not utilize code subset E (i.e., utilizes channel subset ~E). As a consequence, to avoid intracell interference, focused beams $130_X$ and $130_Z$ utilize code subset E in the adjacent regions of their respective sectors $215_X$ and $215_Z$ into which focused beam $130_Y$ scatters or disperses, namely, interference region $250_{YX}$ (in which focused beam $130_Y$ scatters into sector $215_X$), and interference region $250_{YZ}$ (in which focused beam $130_Y$ scatters into sector $215_Z$). Also as mentioned above, as previously assigned, focused beam $130_Y$ utilizes code subset A in the adjacent region of the sector $215_Y$ into which focused beam $130_X$ scatters or disperses, namely, interference region $250_{XY}$ (in which focused beam $130_X$ scatters into sector $215_Y$). Similarly, within sector $215_Y$, the code subsets B, C and D are also assigned to avoid interference with adjacent sectors $215_X$ and $215_Z$. For example, code subset D is utilized in interference region $250_{ZY}$, the region in which the focused beam $130_Z$ scatters into sector $215_Y$, with the remaining code subsets B and C utilized in the balance of sector $215_Y$ that is not subject to scattering from adjacent focused beams 130, as illustrated.

Also as a consequence, in the event any CPE 140 or transceiver 120 within sector $215_Y$ receives any information encoded with a code from code subset E, such as within interference regions $250_{XY}$ and $250_{ZY}$ (in which adjacent focused beams $130_X$ and $130_Z$ scatter into sector $215_Y$), that equipment in sector $215_Y$ may automatically disregard or ignore such information as scatter or dispersion from one of the focused beams 130 of adjacent sectors $215_X$ or $215_Z$. Similarly, in the event any CPE 140 or transceiver 120 within sector $215_X$ receives any information encoded with a code from code subset A, such as within interference region $250_{YX}$ (in which adjacent focused beam $130_Y$ scatters into sector $215_X$), that equipment in sector $215_X$ may automatically disregard or ignore such information as scatter or dispersion from the focused beam $130_Y$ of adjacent sector $215_Y$. Also in the event any CPE 140 or transceiver 120 within sector $215_Z$ receives any information encoded with a code from code subset D, such as within interference region $250_{YZ}$ (in which adjacent focused beam $130_Y$ scatters into sector $215_Z$), that equipment in sector $215_Z$ may automatically disregard or ignore such information as scatter or dispersion from the focused beam $130_Y$ of adjacent sector $215_Y$.

Continuing to refer to FIG. 8, other code subsets are similarly assigned to the next sector $215_Z$ to avoid interference between adjacent sectors. For example, in sector $215_Z$, noting that code subset D was utilized by adjacent focused beam $130_Y$ in the interference region $250_{ZY}$, the focused beam $130_Z$ of the sector $215_Z$ utilizes four other code subsets, A, B, C and E, and does not utilize code subset D (i.e., utilizes channel subset ~D). As a consequence, to avoid intracell interference, the focused beams 130 of the previous sector $215_Y$ and subsequent sector $215_{AA}$ utilize code subset D in the adjacent regions of their respective sectors $215_Y$ and $215_{AA}$ into which focused beam $130_Z$ scatters or disperses, namely, interference region $250_{ZY}$ (in which focused beam $130_Z$ scatters into sector $215_Y$), and interference region $250_{ZAA}$ (in which focused beam $130_Z$ scatters into sector $215_{AA}$). Also as mentioned above, as previously assigned, focused beam $130_Z$ utilizes code subset E in the adjacent region of the sector $215_Z$ into which focused beam $130_Y$ scatters or disperses, namely, interference region $250_{YZ}$ (in which focused beam $130_Y$ scatters into sector $215_Z$). Similarly, within sector $215_Z$, the code subsets A, B and C are also assigned to avoid interference with adjacent sectors $215_Y$ and $215_{AA}$. For example, code subset C is utilized in interference region $250_{AAZ}$, the region in which the focused beam 130 of the subsequent sector $215_{AA}$ scatters into sector $215_Z$, with the remaining code subsets A and B utilized in the balance of sector $215_Z$ that is not subject to scattering from adjacent focused beams 130, as illustrated. As may be apparent from the above discussion, such code assignment may continue for adjacent sectors 215 until subsets of codes have been assigned for each sector 215 within an entire cell region 210.

Also as may be apparent from the exemplary code assignment illustrated above, in accordance with the present invention, symmetries of code assignments in the various interference regions are available to maximize code re-use between adjacent sectors 215 of a cell 210 and thereby increase efficiency and decrease code saturation potential. Within sector $215_X$, the codes utilized by the focused beam $130_X$ within the interference regions created by the adjacent focused beams $130_W$ and $130_Y$ are each excluded from use in the code sets of the corresponding adjacent sectors $215_W$ and $215_Y$: code subset B, utilized in sector $215_X$ within a first interference region (interference region $250_{WX}$), is excluded from the code set used by focused beam $130_W$ in adjacent sector $215_W$; and code subset E, utilized in sector $215_X$ within a second interference region (interference region $250_{YX}$), is excluded from the code set used by focused beam $130_Y$ in sector $215_Y$. Also utilizing sector $215_X$ as an example, such symmetry, may be observed in the use of code subset A, which was excluded from the codes utilized within sector $215_X$, but utilized for both adjacent interference regions in which the focused beam $130_X$ of sector $215_X$ scatters into adjacent sectors $215_Y$ and $215_W$, namely, the first interference region of sector $215_Y$ (interference region $250_{XY}$) and the second interference region of sector $215_W$ (interference regions $250_{XW}$). Such symmetry is applied for sector code assignment of the preferred method of the present invention illustrated below with reference to FIG. 9.

Figure 9A:
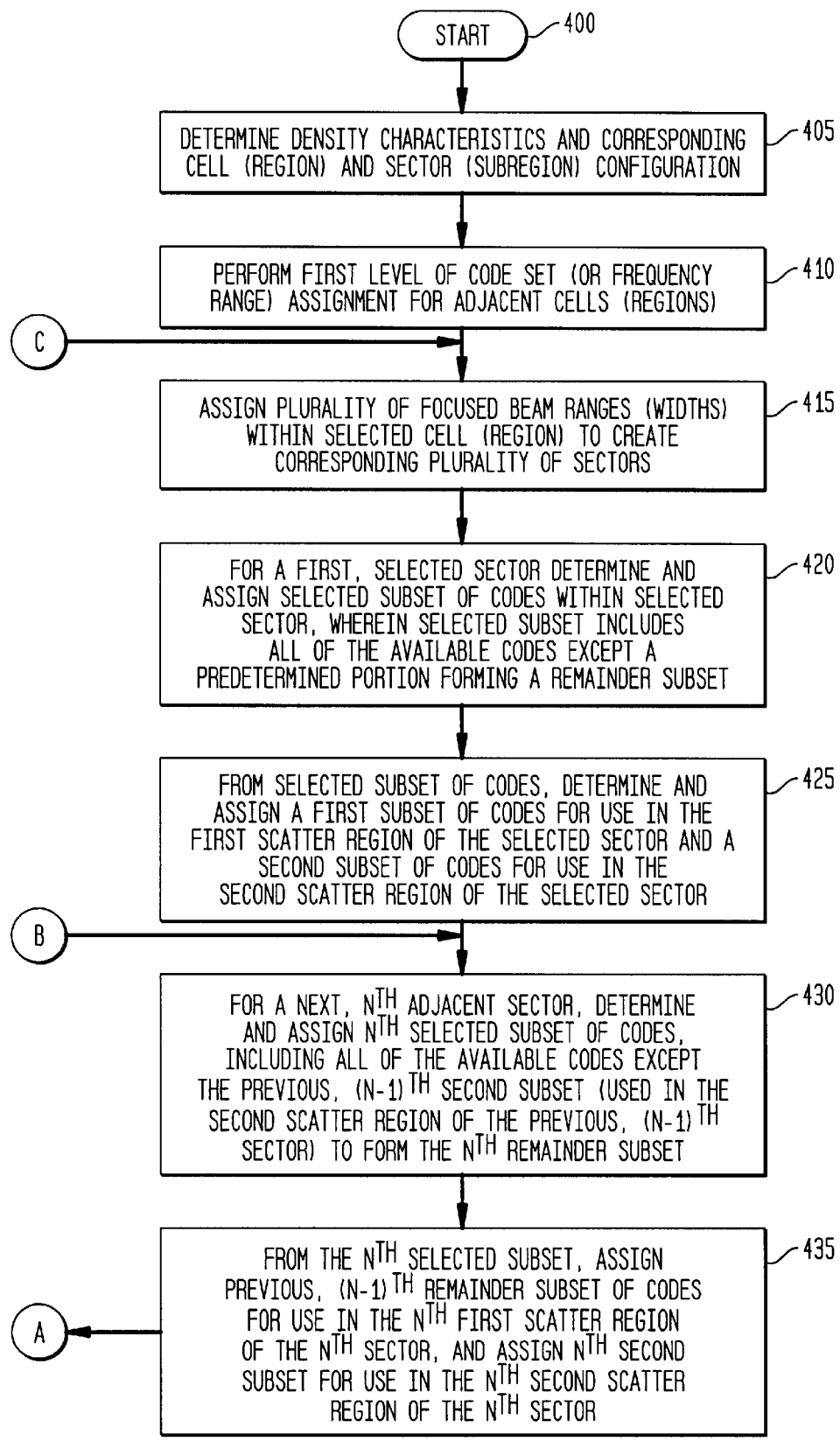
FIG. 9 is a flow diagram illustrating a second method of cell level and sector level frequency and code assignment for focused beams in accordance with the present invention.
Figure 9B:
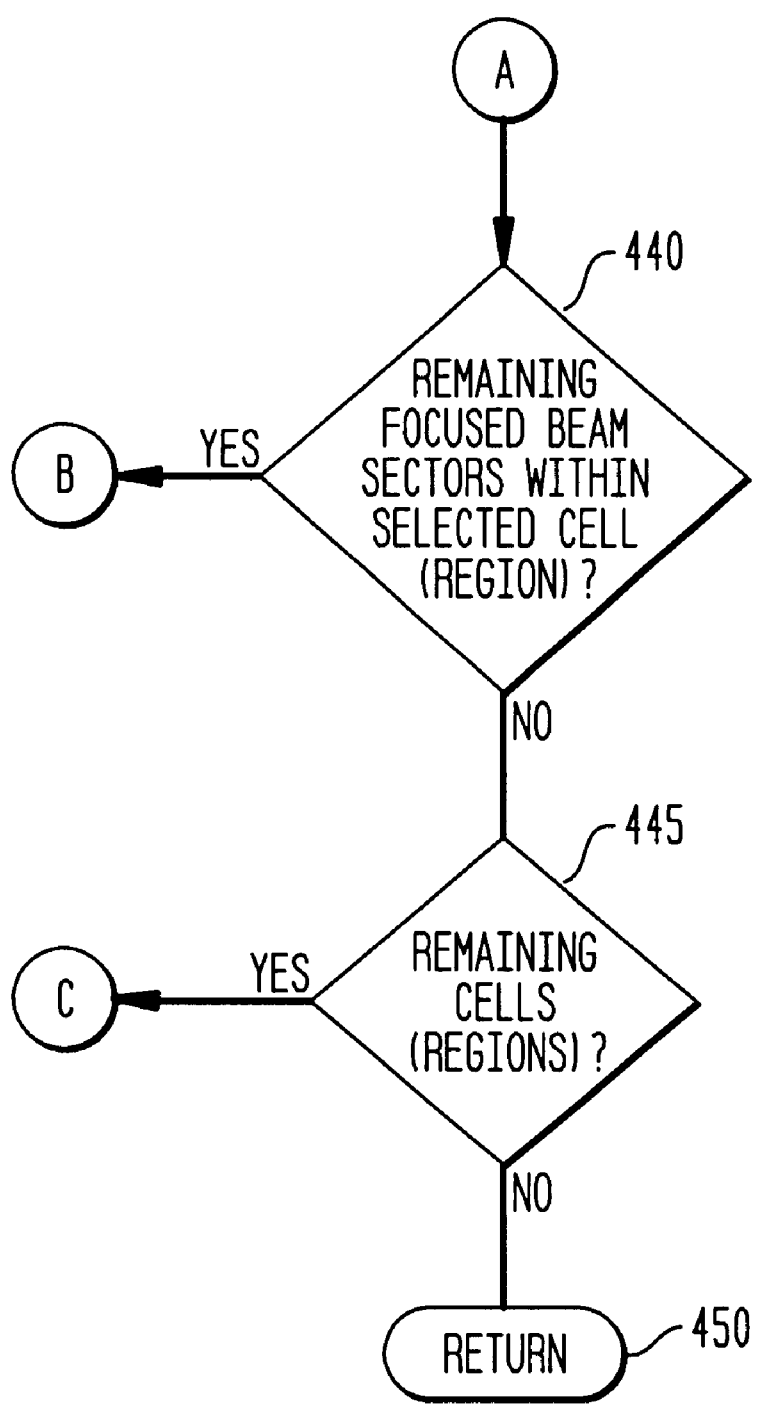

FIG. 9 is a flow diagram illustrating, in greater detail, a second method for cell level and sector level frequency and code assignment for focused beams in accordance with the present invention. For ease of reference, for each sector 215, such as sector $215_Y$, two interference regions may be defined or designated: a first interference region, such as interference region $250_{XY}$, in which the focused beam of the previous adjacent sector (beam $130_X$ of sector $215_X$) scatters into the selected sector $215_Y$; and a second interference region, such as interference region $250_{ZY}$, in which the focused beam of the next adjacent sector (bean $130_Z$ of sector $215_Z$) scatters into the selected sector $215_Y$.

As mentioned above, a significant feature of the method of the present invention, as illustrated in FIGS. 7 and 9, is that channel (or code) assignment may be performed dynamically, by the various system 100 and apparatus 150 embodiments, as needed, to respond to changing environmental conditions. As a consequence, the methodology illustrated below may be repeated on a dynamic basis, assigning a greater number or a lesser number of codes to a given region to accommodate network traffic conditions and density characteristics at any given time.

Another significant feature of the present invention, as illustrated, is that the methodology is not computationally intensive. For example, the code assignment of the present invention does not require a computationally intensive analysis of interference patterns of neighboring cells and sectors. Rather, as utilized within a fixed wireless system with predetermined interference regions, noninterfering codes are simply assigned on an as needed, dynamic basis.

Referring to FIG. 9, beginning with start step 400, density characteristics, and corresponding cell (and sector) configurations, are determined for a given geographic location, step 405, as illustrated above with reference to FIG. 4. For example, areas of high usage or density may have a greater number of cells, and a greater number of sectors within each such cell (utilizing more narrowly focused beams). Next, in step 410, different code sets (time slots, or frequency ranges) are assigned to adjacent cells, to avoid intercell interference, utilizing either frequency division, time division, or code division, as illustrated above with reference to FIG. 3. Next, in step 415, based upon the density characteristics of step 405, a plurality of focused beam ranges (focused beam widths) are assigned within a selected (or given) cell to create a corresponding plurality of sectors, also as illustrated above with reference to FIG. 4. For example, in an area of high density, more narrowly focused beams 130 (such as ten degrees) may be utilized, creating a greater number of sectors within a given cell, compared to an area of lesser density, utilizing less narrowly focused beams 130 (such as twenty degrees), creating a lesser number of sectors within a given cell.

Continuing to refer to FIG. 9, in step 420, for a first, selected sector, a selected subset of codes are determined and assigned, preferably by dividing the available code set by (RSI+1). This selected subset of codes, such as a channel subset ~X, includes all of the available codes assigned for use in the cell except a predetermined portion of the codes, which form a remainder set (equivalently referred to as an excluded subset). As illustrated above with respect to FIG. 8, the available code set included subsets A, B, C, D and E, and the selected subset of codes in sector $215_X$ included subsets B, C, D and E (channel subset ~A), with subset A forming a remainder or excluded subset. Next, in step 425, for the selected sector, a first subset of codes is determined and assigned for use in the first interference region of the selected sector, such as code subset B for first interference region $250_{WX}$ in sector $215_X$, and a second subset of codes is determined and assigned for use in the second interference region of the selected sector, such as code subset E for second interference region $250_{YX}$ in sector $215_X$.

Subsets of codes are then assigned for use in each of the remaining sectors and their corresponding first and second interference regions. Following step 425, a next, $n^{th}$ adjacent sector is selected, and the $n^{th}$ selected subset of codes ($n^{th}$ channel subset) is determined and assigned for this $n^{th}$ adjacent sector, step 430. For example, referring to FIG. 8, moving clockwise from sector $215_X$, the next, $n^{th}$ sector is sector $215_Y$. (In the following discussion, in the event that sectors are selected in a counterclockwise manner, then the designations referred to for first and second interference regions should be reversed). In step 430, the $n^{th}$ selected subset of codes includes all of the available codes for use in the selected cell except the subset of codes previously assigned for use in the $(n-1)^{th}$ second interference region, i.e., excluding the previous, $(n-1)^{th}$ second subset, which now forms the $n^{th}$ remainder subset. Also utilizing FIG. 8 as an example, the subset of codes utilized for the next adjacent sector $215_Y$ included code subsets A, B, C and D (i.e., channel subset ~E), with subset E excluded (and forming a remainder or excluded subset), as subset E was utilized by the focused beam $130_X$ in the second interference region of the previous sector $215_X$, namely, interference region $250_{YX}$. Following step 430, in step 435, from the $n^{th}$ selected subset, the previous, $(n-1)^{th}$ remainder subset of codes is assigned for use in the first interference region of the $n^{th}$ sector, and an $n^{th}$ second subset is assigned for use in the $n^{th}$ second interference region of the $n^{th}$ sector. Again referring to FIG. 8, for sector $215_Y$, the previous, $(n-1)^{th}$ remainder set was subset A (excluded from use in sector $215_X$), and this subset A was assigned for use in the first interference region $250_{XY}$ of sector $215_Y$, to avoid possible interference from the focused beam used in the previous sector $215_X$. Also, as an $n^{th}$ second subset, subset D was assigned for use in the $n^{th}$ second interference region $250^{ZY}$ of the no sector $215_Y$.

Continuing to refer to FIG. 9, following step 435, when there are remaining sectors requiring code assignments within the selected cell, the method returns to step 430 to continue such code assignment, step 440. For example, to continue the code assignments of FIG. 8, again moving clockwise from sector $215_Y$, the next, $n^{th}$ sector is sector $215_Z$. In step 430, the $n^{th}$ selected subset of codes includes all of the available codes for use in the selected cell except the subset of codes previously assigned for use in the $(n-1)^{th}$ second interference region, i.e., excluding the previous, $(n-1)^{th}$ second subset, which now forms the $n^{th}$ remainder subset, with the $n^{th}$ selected subset of codes comprising channel subset ~[$(n-1)^{th}$ second subset]. Also utilizing FIG. 8 as an example, the subset of codes utilized for the next adjacent sector $215_Z$ included code subsets A, B, C and E (i.e., channel subset ~D), with subset D excluded (and forming a remainder or excluded subset), as subset D was utilized by the focused beam $130_Y$ in the second interference region $250_{ZY}$ of the previous sector $215_Y$. Following step 430, in step 435, from this $n^{th}$ selected subset, the previous, $(n-1)^{th}$ remainder subset of codes is assigned for use in the first interference region of the $n^{th}$ sector, and an $n^{th}$ second subset is assigned for use in the $n^{th}$ second interference region of the $n^{th}$ sector. Again referring to FIG. 8, for sector $215_Z$, the previous, $(n-1)^{th}$ remainder set was subset E (excluded from use in sector $215_Y$), and this subset E was assigned for use in the first interference region $250_{YZ}$ of sector $215_Z$, to avoid possible interference from the focused beam used in the previous sector $215_Y$. Also, as an $n^{th}$ second subset, subset C was assigned for use in the $n^{th}$ second interference region $250_{AAZ}$ of the $n^{th}$ sector $215_Z$.

Following step 440, when code assignments have been completed for all sectors within a given, selected cell, the method determines whether there are remaining cells within the region which require code assignments, step 445. When there are remaining cells within the geographic region which require code assignments in step 445, the method returns to step 415 to continue such code assignments. When codes have been assigned in all sectors and cells, the method may end, return 450.

Numerous advantages of the present invention may be apparent from the above discussion. First, the apparatus, method and system of the present invention provide for efficient wireless distribution of telecommunication services, and have both a greater capacity for avoiding saturation and for avoiding interference in neighboring regions.

Second, another significant feature of the present invention, is that code assignment may be performed dynamically, as needed, to respond to changing environmental conditions. A greater number or a lesser number of codes may be dynamically assigned to a given region to accommodate network traffic conditions and density characteristics at any given time.

Another significant feature of the present invention, as illustrated, is that the methodology is not computationally intensive. As a consequence, the various implementations of the invention do not require significant processing resources, and the apparatus, method and system of the present invention are capable of cost-effective implementation.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for topological channel assignment for focused beam, fixed wireless telecommunications, the method comprising:

(a) determining a cell configuration to form a plurality of adjacent cells;

(b) determining an available channel set, of a plurality of available channel sets, for a selected cell of the plurality of adjacent cells;

(c) within the selected cell, determining a plurality of focused beam ranges to create a corresponding plurality of sectors and a corresponding plurality of interference regions;

(d) determining a plurality of channel subsets for the corresponding plurality of sectors, wherein each channel subset of the plurality of channel subsets consists of the available channel set excluding an exclusion channel subset of a plurality of exclusion channel subsets; and (e) for each interference region of the plurality of interference regions, assigning the exclusion channel subset of an adjacent sector of the plurality of sectors.

2. The method of claim 1, further comprising:

(f) repeating steps (b) through (e), inclusive, for each selected cell of the plurality of adjacent cells.

3. The method of claim 1, wherein step (b) further comprises:

determining the plurality of available channel sets for a corresponding plurality of adjacent cells, wherein each available channel set is distinctive from each other available channel set of the plurality of available channel sets.

4. The method of claim 3, further comprising:

assigning the available channel set to the selected cell which is distinctive from each of the other available channel sets assigned to each adjacent cell of the plurality of adjacent cells.

5. The method of claim 1, wherein the available channel set of the plurality of available channel sets is an orthogonal code set from a 10 MHz spectrum.

6. The method of claim 1, wherein the cell configuration is a hexagonal topology and wherein three orthogonal code sets comprise the plurality of available channel sets.

7. The method of claim 1, wherein each focused beam range of the plurality of focused beam ranges is between eight degrees and sixty degrees.

8. The method of claim 1, wherein each interference region of the plurality of interference regions is between two degrees and fifteen degrees.

9. The method of claim 1, wherein channel assignment is dynamically determined based upon a plurality of density characteristics.

10. The method of claim 9, wherein the plurality of density characteristics include usage levels and geographic locations of a plurality of customer premise equipment.

11. The method of claim 1, wherein the plurality of available channel sets are formed by time division.

12. The method of claim 1, wherein the plurality of available channel sets are formed by frequency division.

13. The method of claim 1, further comprising:

determining the plurality of channel subsets as a number of channel subsets equal to the arithmetic sum of (1+RSI), wherein RSI is a smallest ratio of (a sector range of a selected sector of the plurality of sectors) to (a range of an interference region of the selected sector), and wherein when RSI is fractional, RSI is rounded to the next lowest integer value.

14. The method of claim 1, wherein steps (d) and (e) further comprise:

for a first sector of the plurality of sectors, determining a first selected channel subset and an exclusion channel subset from the available channel set, and from the first selected channel subset, assigning a first channel subset for a first interference region of the first sector and a second channel subset for a second interference region of the first sector; and for a next adjacent sector, determining and assigning a next selected channel subset and a next exclusion channel subset from the available channel set, with a previous second channel subset of a previous adjacent sector forming the next exclusion channel subset, and from the next selected channel subset, assigning a previous exclusion channel subset for the first interference region of the next adjacent sector, and assigning a next second channel subset for the second interference region of the next adjacent sector.

15. An apparatus for topological channel assignment for focused beam, fixed wireless telecommunications, the apparatus comprising:

a network interface;

a memory; and a processor coupled to the network interface and to the memory, wherein the processor includes instructions for determining a cell configuration to form a plurality of adjacent cells; determining an available channel set, of a plurality of available channel sets, for a selected cell of the plurality of adjacent cells, and within the selected cell, determining a plurality of focused beam ranges to create a corresponding plurality of sectors and a corresponding plurality of interference regions; the processor including further instructions for determining a plurality of channel subsets for the corresponding plurality of sectors, wherein each channel subset of the plurality of channel subsets consists of the available channel set excluding an exclusion channel subset of a plurality of exclusion channel subsets; and for each interference region of the plurality of interference regions, the processor including further instructions for assigning the exclusion channel subset of an adjacent sector of the plurality of sectors.

16. The apparatus of claim 15, wherein the processor includes further instructions for determining and assigning a plurality of channel subsets for the plurality of sectors, for each selected cell of the plurality of adjacent cells.

17. The apparatus of claim 15, wherein the processor includes further instructions for determining a plurality of available channel sets for a corresponding plurality of adjacent cells, wherein each available channel set is distinctive from each other available channel set of the plurality of available channel sets.

18. The apparatus of claim 17, wherein the processor includes further instructions for assigning the available channel set to the selected cell which is distinctive from each of the other available channel sets assigned to each adjacent cell of the plurality of adjacent cells.

19. The apparatus of claim 15, wherein the processor includes further instructions for determining the plurality of available channel sets as orthogonal code sets from a 10 MHz spectrum.

20. The apparatus of claim 15, wherein the processor includes further instructions for determining the cell configuration as a hexagonal topology and for determining the plurality of available channel sets as three orthogonal code sets.

21. The apparatus of claim 15, wherein the processor includes further instructions for determining each focused beam range of the plurality of focused beam ranges to be between eight degrees and sixty degrees.

22. The apparatus of claim 15, wherein each interference region of the plurality of interference regions is between two degrees and fifteen degrees.

23. The apparatus of claim 15, wherein the processor includes further instructions for dynamically determining channel assignment based upon a plurality of density characteristics.

24. The apparatus of claim 23, wherein the plurality of density characteristics include usage levels and geographic locations of a plurality of customer premise equipment.

25. The apparatus of claim 15, wherein the processor includes further instructions for determining the plurality of available channel sets by time division.

26. The apparatus of claim 15, wherein the processor includes further instructions for determining the plurality of available channel sets by frequency division.

27. The apparatus of claim 15, wherein the processor includes further instructions for determining the plurality of channel subsets as a number of channel subsets equal to the arithmetic sum of (1+RSI), wherein RSI is a smallest ratio of (a sector range of a selected sector of the plurality of sectors) to (a range of an interference region of the selected sector), and wherein when RSI is fractional, RSI is rounded to the next lowest integer value.

28. The apparatus of claim 15, wherein the processor includes further instructions, for a first sector of the plurality of sectors, for determining a first selected channel subset and an exclusion channel subset from the available channel set, and from the first selected channel subset, assigning a first channel subset for a first interference region of the first sector and a second channel subset for a second interference region of the first sector; and wherein the processor includes further instructions, for a next adjacent sector, for determining and assigning a next selected channel subset and a next exclusion channel subset from the available channel set, with a previous second channel subset of a previous adjacent sector forming the next exclusion channel subset, and from the next selected channel subset, assigning a previous exclusion channel subset for the first interference region of the next adjacent sector, and assigning a next second channel subset for the second interference region of the next adjacent sector.

29. A system for topological channel assignment for focused beam, fixed wireless telecommunications, the system comprising:

a plurality of transceivers, each transceiver of the plurality of transceivers having a focused beam range, of a plurality of focused beam ranges; and a switch coupled to the plurality of transceivers, wherein the switch includes instructions for determining a cell configuration to form a plurality of adjacent cells, for determining an available channel set, of a plurality of available channel sets, for a selected cell of the plurality of adjacent cells, and within the selected cell, for determining the plurality of focused beam ranges to create a corresponding plurality of sectors and a corresponding plurality of interference regions; the switch including further instructions for determining a plurality of channel subsets for the corresponding plurality of sectors, wherein each channel subset of the plurality of channel subsets consists of the available channel set excluding an exclusion channel subset of a plurality of exclusion channel subsets; and for each interference region of the plurality of interference regions, the switch including further instructions for assigning the exclusion channel subset of an adjacent sector of the plurality of sectors.

30. The system of claim 29, wherein the switch includes further instructions for determining and assigning a plurality of channel subsets for the plurality of sectors, for each selected cell of the plurality of adjacent cells.

31. The system of claim 29, wherein the switch includes further instructions for determining a plurality of available channel sets for a corresponding plurality of adjacent cells, wherein each available channel set is distinctive from each other available channel set of the plurality of available channel sets.

32. The system of claim 31, wherein the switch includes further instructions for assigning the available channel set to the selected cell which is distinctive from each of the other available channel sets assigned to each adjacent cell of the plurality of adjacent cells.

33. The system of claim 29, wherein the switch includes further instructions for determining the plurality of available channel sets as orthogonal code sets from a 10 MHz spectrum.

34. The system of claim 29, wherein the switch includes further instructions for determining the cell configuration as a hexagonal topology and for determining the plurality of available channel sets as three orthogonal code sets.

35. The system of claim 29, wherein the switch includes further instructions for determining each focused beam range of the plurality of focused beam ranges to be between eight degrees and sixty degrees.

36. The system of claim 29, wherein each interference region of the plurality of interference regions is between two degrees and fifteen degrees.

37. The system of claim 29, wherein the switch includes further instructions for dynamically determining channel assignment based upon a plurality of density characteristics.

38. The system of claim 37, wherein the plurality of density characteristics include usage levels and geographic locations of a plurality of customer premise equipment.

39. The system of claim 29, wherein the switch includes further instructions for determining the plurality of available channel sets by time division.

40. The system of claim 29, wherein the switch includes further instructions for determining the plurality of available channel sets by frequency division.

41. The system of claim 29, wherein the switch includes further instructions for determining the plurality of channel subsets as a number of channel subsets equal to the arithmetic sum of (1+RSI), wherein RSI is a smallest ratio of (a sector range of a selected sector of the plurality of sectors) to (a range of an interference region of the selected sector), and wherein when RSI is fractional, RSI is rounded to the next lowest integer value.

42. The system of claim 29, wherein the switch includes further instructions, for a first sector of the plurality of sectors, for determining a first selected channel subset and an exclusion channel subset from the available channel set, and from the first selected channel subset, assigning a first channel subset for a first interference region of the first sector and a second channel subset for a second interference region of the first sector; and wherein the switch includes further instructions, for a next adjacent sector, for determining and assigning a next selected channel subset and a next exclusion channel subset from the available channel set, with a previous second channel subset of a previous adjacent sector forming the next exclusion channel subset, and from the next selected channel subset, assigning a previous exclusion channel subset for the first interference region of the next adjacent sector, and assigning a next second channel subset for the second interference region of the next adjacent sector.

* * * * *